United States Patent
Yampanis

(10) Patent No.: US 9,646,021 B2
(45) Date of Patent: May 9, 2017

(54) MANAGING RESOURCE ACCESS IN DISTRIBUTED COMPUTING ENVIRONMENTS

(71) Applicant: AT&T Intellectual Property I, L.P., Atlanta, GA (US)

(72) Inventor: Mark J. Yampanis, Berkeley, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 445 days.

(21) Appl. No.: 13/633,350

(22) Filed: Oct. 2, 2012

(65) Prior Publication Data

US 2014/0095666 A1    Apr. 3, 2014

(51) Int. Cl.
  *G06F 15/16*    (2006.01)
  *G06F 17/30*    (2006.01)

(52) U.S. Cl.
  CPC .. *G06F 17/30197* (2013.01); *G06F 17/30902* (2013.01)

(58) Field of Classification Search
  CPC ................................................ G06F 17/30902
  USPC ....................................................... 709/219
  See application file for complete search history.

(56) References Cited

U.S. PATENT DOCUMENTS

| | | | |
|---|---|---|---|
| 5,109,510 A | 4/1992 | Baker et al. | |
| 5,642,515 A | 6/1997 | Jones et al. | |
| 6,195,678 B1 | 2/2001 | Komuro | |
| 7,730,155 B1* | 6/2010 | Meyer | H04W 4/02 709/201 |
| 8,218,090 B2 | 7/2012 | Yee et al. | |
| 2006/0122836 A1* | 6/2006 | Cross, Jr. | G10L 15/30 704/260 |
| 2006/0221858 A1* | 10/2006 | Switzer | G06F 9/4443 370/254 |
| 2008/0071922 A1 | 3/2008 | Chetuparambil et al. | |
| 2008/0162582 A1* | 7/2008 | Brooks et al. | 707/200 |

(Continued)

OTHER PUBLICATIONS

American Intercontinental University, "Local Storage vs. Cloud Storage," [http://www.aiuniv.edu/Student-Life/Blog/July-2012/Local-Storage-Vs-Cloud-Storage], Jul. 10, 2012.

(Continued)

*Primary Examiner* — Hamza Algibhah
(74) *Attorney, Agent, or Firm* — Hartman & Citrin LLC

(57) ABSTRACT

Concepts and technologies are disclosed herein for managing resource access in distributed computing environments. A computing device can host a local resource such as a file or application and an application for managing or controlling resource access. The user device can communicate with a remote device that hosts a remote resource, which may be similar to the local resource. If a resource access request is detected at the user device, the user device can identify resources including a local resource and/or a remote resource that can provide functionality associated with the request. The user device can determine if the local resource, the remote resource, and/or a combination thereof is to be accessed to provide the requested access. This determination can be made before or during the access and can be based upon settings, preferences, input, network traffic, and/or other considerations determined at the user device and/or other devices.

17 Claims, 9 Drawing Sheets

(56) References Cited

U.S. PATENT DOCUMENTS

| | | | |
|---|---|---|---|
| 2008/0222628 A1* | 9/2008 | Batra | G06F 8/60 717/171 |
| 2009/0217354 A1 | 8/2009 | Blum et al. | |
| 2011/0087603 A1* | 4/2011 | Garcia | G06F 17/30905 705/55 |
| 2012/0005259 A1* | 1/2012 | Cok | G06F 9/5027 709/203 |
| 2012/0005269 A1* | 1/2012 | Janssen | G06F 3/0481 709/203 |
| 2012/0054357 A1* | 3/2012 | Kuritzky | H04L 63/083 709/229 |
| 2012/0096365 A1* | 4/2012 | Wilkinson | G06F 9/468 715/740 |
| 2012/0158984 A1* | 6/2012 | Maitre | H04N 21/643 709/231 |
| 2012/0233227 A1* | 9/2012 | Alexander et al. | 707/827 |
| 2012/0254116 A1* | 10/2012 | Thereska et al. | 707/640 |
| 2012/0303763 A1* | 11/2012 | Duggal | G06Q 10/10 709/219 |
| 2013/0238975 A1* | 9/2013 | Chan | G06F 17/30902 715/234 |

OTHER PUBLICATIONS

"How to Execute Program on Remote Computer," Easy Way to Automate Testing: Automated Software Testing and Different Ways on How to do More and Quicker at a Shorter Time, [http://motevich.blogspot.com/2007/11/execute-program-on-remote-computer.html], 2007.

Newman, Jared, "How to Choose Between Cloud Storage Services like Google Drive and Dropbox," Time Techland, News and Reviews About Gadgets, Gear, Apps and the Web, [http://techland.time.com/2012/04/27/how-to-choose-between-cloud-storage-services-like-google-drive-and-dropbox/], Apr. 27, 2012.

* cited by examiner

MANAGING RESOURCE ACCESS IN DISTRIBUTED COMPUTING ENVIRONMENTS

BACKGROUND

Network access is often available to users at almost any geographic location. Furthermore, the proliferation of networked and/or communications-equipped devices has increased dramatically over the past several years. Thus, users sometimes utilize remote devices such as web servers or databases to access information and/or applications. At times, these applications and/or information may be accessed over multiple networks and/or connections and therefore performance of the accessed applications and/or information may be diminished.

Furthermore, while some applications are natively executed by user devices, some applications may be executed by servers or other devices remote from a user device. Accessing these applications over long geographic distances may also entail traversing multiple networks and/or devices, and therefore may also result in diminished performance. Furthermore, some applications that may be accessed by a user device may be duplicative of a native application installed at the user device. Thus, a user may access functionality remotely when that functionality may be available locally, and vice versa.

SUMMARY

The present disclosure is directed to managing resource access in distributed computing environments. According to some embodiments of the concepts and technologies disclosed herein, a user device can host a local resource and an application manager. The user device also can communicate with a remote device that can host a remote resource. The local resource and/or the remote resource may include an application, a file, and/or the like. The local resource and the remote resource may be copies of one another and therefore may be similar or even identical. If a resource access request is detected at the user device, the user device can identify resources that can provide functionality associated with the request and determine if the local resource, the remote resource, and/or a combination thereof is to be accessed. This determination can be based upon settings, preferences, input, network traffic, and/or other considerations.

During access of the local and/or remote resource, the application manager can be configured to determine if resources are to be switched. As used herein, the term "switch" and/or variants thereof, as used with respect to the resources accessed by the client devices, can refer to reducing, eliminating, adding, and/or increasing access of one or more of the remote resource and the local resource. The determination as to whether resources are to be switched can be based upon network traffic, memory and/or processing utilization of the user device and/or a remote device hosting the remote resource, settings, configurations, or the like. The application manager can monitor the resource access operations and determine, at any time before the operation is complete, if the resources are to be switched.

According to one aspect of the concepts and technologies disclosed herein, a computing device is disclosed. The computing device can include a processor and a memory. The memory can store computer-executable instructions that, when executed by the processor, cause the processor to perform operations including identifying resources to provide functionality associated with a resource access request, the resources including a remote resource and a local resource, and determining if a setting specifies use of the remote resource to provide the functionality associated with the resource access request. If the setting specifies use of the remote resource, the operations can further include causing the computing device to access the remote resource. If the setting does not specify use of the remote resource, the operations can further include accessing the local resource.

In some embodiments, the remote resource can include a file stored at a remote device, and the local resource can include a file stored at the computing device. In some other embodiments, the remote resource can include an application hosted by a remote device, and the local resource can include an application hosted at the computing device. The computer-executable instructions can also include instructions that, when executed by the processor, cause the processor to perform operations further including obtaining network traffic information between the remote device and the computing device, comparing the network traffic information to a network traffic threshold, and determining, based upon the network traffic information, if the computing device is to switch resources accessed by the computing device.

In some embodiments, the computer-executable instructions can further include instructions that, when executed by the processor, cause the processor to perform operations further including obtaining network traffic information associated with a virtual private network via which the remote device and the computing device communicate, comparing the network traffic information to a network traffic threshold, and determining, based upon the comparing, if the computing device is to switch resources accessed by the computing device. In some embodiments, the computer-executable instructions can further include instructions that, when executed by the processor, cause the processor to perform operations further including generating a user interface including an option to access the remote resource, a further option to access the local resource, and a text entry field for specifying a location of the remote resource. The computer-executable instructions also can include instructions that, when executed by the processor, cause the processor to perform operations further including determining if input for switching resources accessed by the computing device is received at the computing device. If the input is received, the operations can further include causing the computing device to switch the resources. If the input is not received, the operations can further include causing the computing device to continue to access the resources. The computer-executable instructions also can include instructions that, when executed by the processor, cause the processor to perform operations further including generating a user interface including a status of a resource access operation and an option to switch the resources accessed by the computing device.

According to another aspect of the concepts and technologies disclosed herein, a system is disclosed. The system can include a processor and a memory that stores computer-executable instructions that, when executed by the processor, cause the processor to perform operations including identifying resources to provide functionality associated with a resource access request, the resources including a remote resource located at a remote device and a local resource, and determining if a setting specifies use of the remote resource to provide the functionality associated with the resource access request. If the setting specifies use of the remote resource, the operations can further include accessing the remote resource at the remote device. If the setting does not specify use of the remote resource, the operations can further include accessing the local resource.

In some embodiments, the remote resource can include an application hosted by the remote device, and the local resource can include a copy of the application hosted by a computing device. The system also can include a communications network between the remote device and the computing device. The computing device can communicate with the remote device via a virtual private network established over the communications network. In some embodiments, the computer-executable instructions can further include instructions that, when executed by the processor, cause the processor to perform operations further including obtaining network traffic information associated with the virtual private network, and determining, based upon the network traffic information, whether to switch resources accessed by the computing device.

In some embodiments, the computer-executable instructions can further include computer-executable instructions that, when executed by the processor, cause the processor to perform operations further including generating a user interface including an option to access the remote resource, a further option to access the local resource, and a text entry field for specifying a location of the remote resource. The computer-executable instructions can further include computer-executable instructions that, when executed by the processor, cause the processor to perform operations further including generating a further user interface including a status of a resource access operation and an option to switch the resources accessed. In some embodiments, the computer-executable instructions further include computer-executable instructions that, when executed by the processor, cause the processor to perform operations further including determining if input for switching resources accessed by a computing device has been received, and if the input for switching the resources has been received, switching the resources.

According to yet another aspect, a computer storage medium is disclosed. The computer storage medium can have computer-executable instructions stored thereon that, when executed by a processor, cause the processor to perform operations including identifying resources to provide functionality associated with a resource access request, the resources including a local resource and a remote resource, and determining if a setting specifies use of the remote resource to provide the functionality associated with the resource access request. If the setting specifies use of the remote resource, the operations can further include accessing the remote resource. If the setting does not specify use of the remote resource, the operations can further include accessing the local resource.

In some embodiments, the computer-executable instructions further include instructions that, when executed by the processor, cause the processor to perform operations further including obtaining network traffic information associated with a virtual private network between the processor and a remote device hosting the remote resource, and determining, based upon the network traffic information, whether to switch resources accessed by the processor. The computer storage medium can further include computer-executable instructions that, when executed by the processor, cause the processor to perform operations further including determining if input for switching resources accessed by the processor has been received, and if the input for switching the resources has been received, switching the resources. The computer-executable instructions can include instructions that, when executed by the processor, cause the processor to perform operations further including generating a user interface including an option to access the remote resource, a further option to access the local resource, and a text entry field for specifying a location of the remote resource, and generating a further user interface including a status of a resource access operation and an option to switch the resources accessed. In some embodiments, the computer-executable instructions can include instructions that, when executed by the processor, cause the processor to perform operations further including determining if the resource access operation is complete, and in response to determining that the resource access operation is not complete, determining if resources accessed during the resource access operation are to be switched.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to managing resource access in distributed computing environments. According to some embodiments of the concepts and technologies disclosed herein, a user device or other computing device can host a local resource such as a file or application. The user device also can host an application manager or other application for managing or controlling resource access. The user device also can communicate with a remote device that can host a remote resource, which may be similar or even identical to the local resource. If a resource access request is detected at the user device, the user device can identify resources. The resources can include a local resource and/or a remote resource that can provide functionality associated with the request. The user device can also determine if the local resource, the remote resource, and/or a combination thereof is to be accessed to provide the requested access. This determination can be based upon settings, preferences, input, network traffic, and/or other considerations determined at the user device and/or other devices configured to provide the functionality described herein for managing resource access.

During access of the local and/or remote resource, the application manager can be configured to determine if resources are to be switched. The determination as to whether resources are to be switched can be based upon network traffic, memory and/or processing utilization of the user device and/or a remote device hosting the remote resource, settings, configurations, or the like. The determination also can be based upon input received at the user device and/or elsewhere. The application manager can monitor the resource access operations and determine, at any time before the operation is complete, if the resources are to be switched.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
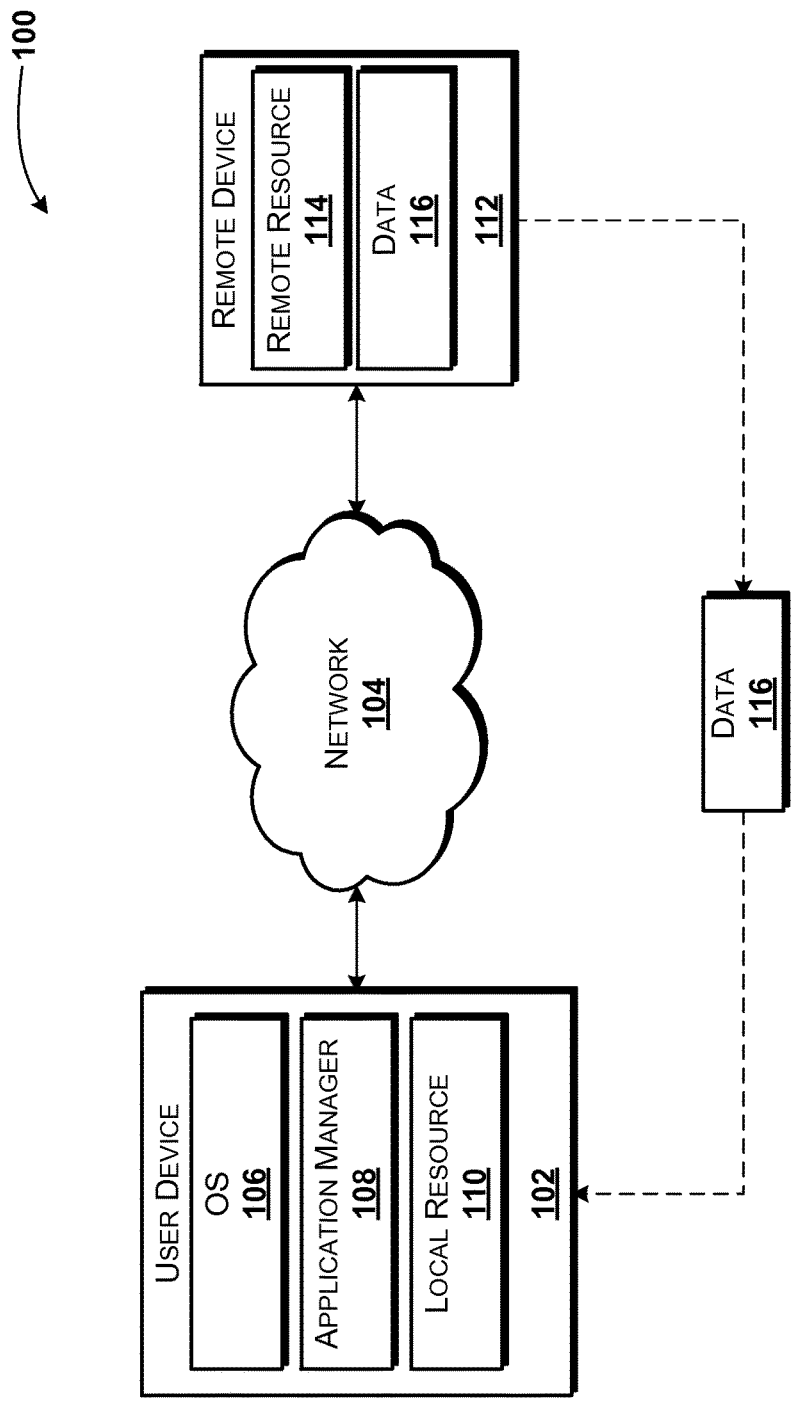
FIG. 1 is a system diagram illustrating an illustrative operating environment for the various embodiments disclosed herein.

Referring now to FIG. 1, aspects of an operating environment 100 for various embodiments of the concepts and technologies disclosed herein for a verification service for providing data delivery with sender verification will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more server computers, desktop computers, mobile telephones, smartphones, laptop computers, set-top boxes, embedded control systems, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a personal computer ("PC"). It should be understood that this embodiment is illustrative, and should not be construed as being limiting in any way.

The user device 102 can execute an operating system 106 and one or more application programs such as, for example, an application manager 108 and/or other application programs. The operating system 106 is a computer program for controlling the operation of the user device 102. The application manager 108 is an executable program that executes on top of the operating system 106 to provide the functionality described herein for managing resource access.

The user device 102 also can execute, host, or store a local resource 110. The local resource 110 can include an application program, a file, a data structure, and/or other types of data. In some embodiments, the local resource 110 generates data such as application data. In some other embodiments, the local resource 110 accesses data from one or more devices that are remote from the user device 102 such as, for example, a server computer, a personal computer, a database, and/or other types of real or virtual devices (hereinafter referred to as a "remote device 112"). In FIG. 1, the user device 102 is illustrated as communicating with a remote device 112, and the remote device 112 is described herein as a remote personal computer. Because other types of remote devices 112 can be accessed in accordance with various embodiments of the concepts and technologies described herein, it should be understood that this embodiment is illustrative, and should not be construed as being limiting in any way.

As shown in FIG. 1, the remote device 112 can host or store a remote resource 114. The remote resource 114 can include an application program, a software module, a file, and/or other types of data ("data") 116 that can be stored, hosted, and/or generated by the remote device 112. The remote device 112 can expose or share the data 116 with various devices including, but not limited to, the user device 102. In some embodiments, the remote device 112 can transmit the data 116 to the user device 102. For example, the remote resource 114 can correspond, in some embodiments, to a web application. As such, the data 116 can correspond to application data that can be accessed by the user device 102 to provide functionality associated with the web application.

In some other embodiments, the remote device 112 can include a personal computer that executes the remote resource 114, wherein the remote resource 114 can correspond to a natively executed application program. As such, the data 116 can correspond to application data generated by the application program. In some other embodiments, the remote resource 114 can correspond to a file stored at the remote device 112. For purposes of describing the embodiments of the concepts and technologies described herein, the remote device 112 is described herein as a personal computer that generates or stores the data 116, wherein the data 116 corresponds to application data and/or a file. It should be understood that these embodiments are illustrative, and should not be construed as being limiting in any way.

In some instances, the local resource 110 at the user device 102 and the remote resource 114 at the remote device 112 can provide similar or even identical functionality. For example, the local resource 110 and the remote resource 114 can correspond to an application program such as a computer aided design ("CAD") application, a multimedia application, a productivity software application, a personal information management ("PIM") application, or other types of application programs. In some other embodiments, the local resource 110 and the remote resource 114 can correspond to a file such as a media file, a database, and/or other types of data. According to various embodiments, a user or other entity associated with the user device 102 may access the application program or the file by accessing the local resource 110 or the remote resource 114.

In some instances, the user device 102 can be configured to access the local resource 110 and/or the remote resource 114 based upon utilization of the user device 102, the remote device 112, a network connection between the user device 102 the remote device 112, memory usage at the user device 102 and/or the remote device 112, other operations occurring at the user device 102 and/or the remote device 112, and/or for other reasons. As will be explained in more detail herein, a user or other entity can specify settings, preferences, or the like for accessing the local resource 110 and/or the remote resource 114. Similarly, the user device 102 can determine, during an operation or other type of resource access, if the resources are to be switched based upon network congestion, device utilization, and/or other performance characteristics of the user device 102 and/or the remote device 112. Some illustrative user interfaces for providing these and/or other functionality described herein for managing resource access are illustrated and described in more detail below with reference to FIGS. 3A-3E.

As will be described in more detail below with reference to FIG. 4, the network 104 can include various types of networks and/or devices. In some embodiments, the network 104 provides and/or is used to provide a virtual private network ("VPN") between the user device 102 and the remote device 112. As such, the user device 102 and the remote device 112 can be configured to interact with one another as if co-located at a single geographic location, though the VPN can exist over large geographic locations such as across state lines, across international borders, and/or even across multiple continents. As such, it should be understood that the network 104 can include a distributed computing environment such as a cloud computing environment, a distributed network, real and/or virtual computers, and/or other resources.

The application manager 108 can be configured to control and/or manage access to the local resource 110 and/or the remote resource 114. In particular, the application manager 108 can be configured to detect access of a resource such as the local resource 110 and/or the remote resource 114. The application manager 108 can detect the access via detecting access of a web application, initialization of a native application, access of a file or other data at the user device 102 and/or the remote device 112, and/or via recognizing other operations. Thus, it should be understood that the application manager can be configured to monitor activity at the user device 102 including access of remote devices such as the remote device 112.

The application manager 108 also can identify one or more resources capable of providing the functionality of the resource access request detected by the application manager 108. Thus, the application manager 108 can determine if one or more of the local resource 110 and/or remote resource 114 can provide the requested resource access. In some embodiments, this determination can be made by examining one or more settings, preferences, and/or configurations associated with the application manager 108. In some other embodiments, this determination can be made by accessing one or more remote devices, locations, and/or networks specified by a user or other entity.

The application manager 108 also can determine if a setting specifies use of a remote resource 114. If so, the application manager 108 can cause the user device 102 to access the remote resource 114 for the requested resource access such as downloading a file, executing an application, or the like. If not, the application manager 108 can cause the user device 102 to access the local resource 110. In some embodiments, the application manager 108 can determine that the local resource 110 and the remote resource 114 are to be accessed and therefore can cause the user device 102 to access both the local resource 110 and the remote resource 114.

During access of the local and/or remote resources, the application manager 108 can determine if network traffic and/or input received from a user or other entity suggest or command switching of the accessed resources. Thus, for example, if network congestion between the user device 102 and the remote device 112 exceeds or drops below specified thresholds, the application manager 108 can cause the user device 102 to switch resources and/or to access additional and/or alternative resources. The application manager 108 can repeat the analysis of the traffic and/or monitor for input until the operation is complete. Additional details of how the application manager 108 controls or manages resource access are described below with reference to FIGS. 3A-3E.

Although the application manager 108 is illustrated as a component of the user device 102, it should be understood that the application manager 108 may be embodied as or in a stand-alone device operating as a part of and/or in communication with the network 104 and/or the user device 102. As such, the illustrated embodiment should be understood as being illustrative of only some contemplated embodiments and should not be construed as being limiting in any way.

FIG. 1 illustrates one user device 102, one network 104, and one remote device 112. It should be understood, however, that various implementations of the operating environment 100 include multiple user devices 102, multiple networks 104, and/or multiple remote devices 112. As such, the illustrated embodiment should be understood as being illustrative, and should not be construed as being limiting in any way.

Figure 2:
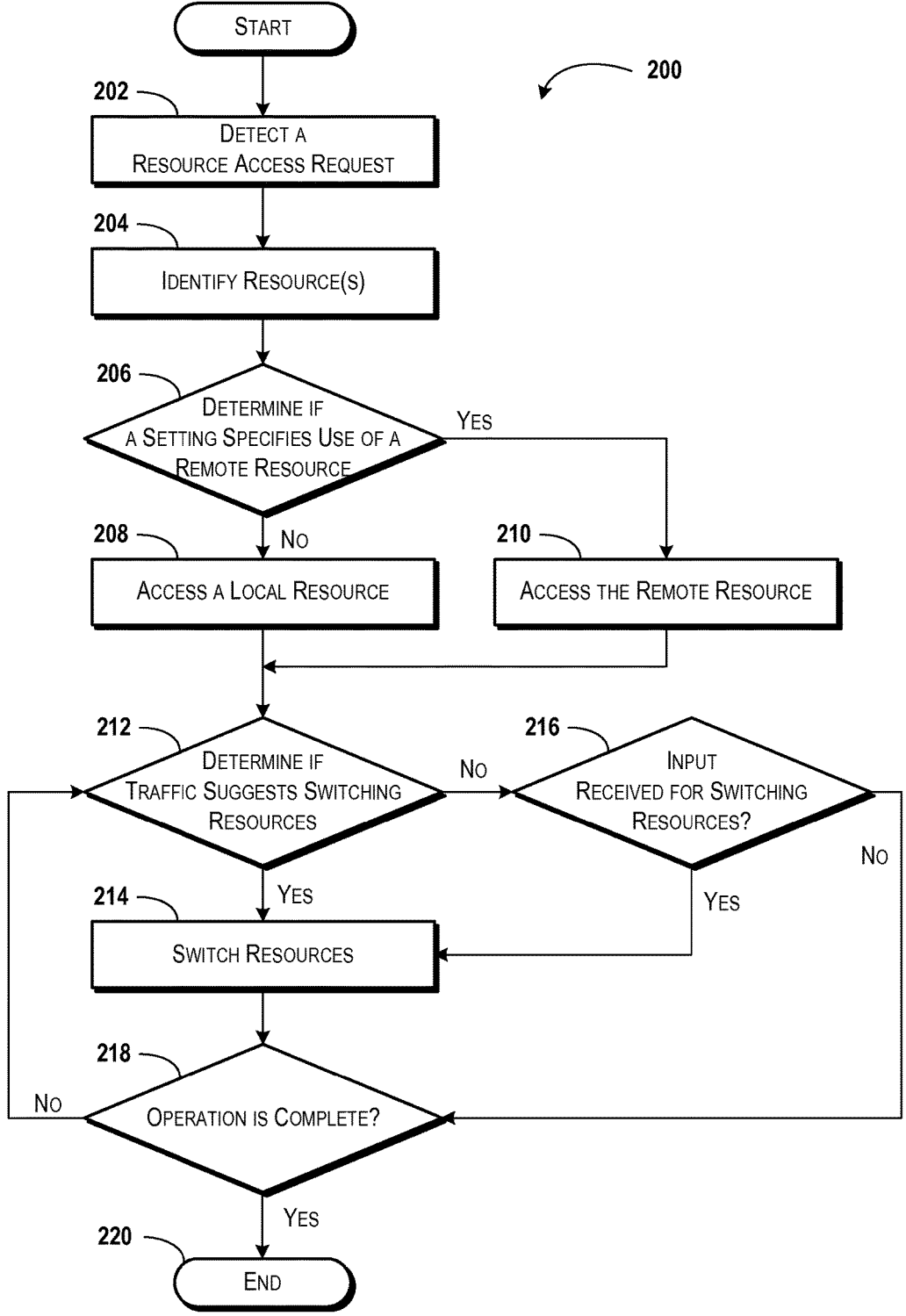
FIG. 2 is a flow diagram showing aspects of a method for managing resource access in distributed computing environments, according to an illustrative embodiment.

Turning now to FIG. 2, aspects of a method 200 for managing resource access in distributed computing environments will be described in detail, according to an illustrative embodiment. It should be understood that the operations of the method 200 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the method 200 can be ended at any time and need not be performed in its entirety. Some or all operations of the method 200, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" can refer to causing a processor of a computing system or other device to request, trigger, cause, and/or perform one or more operations. The phrase "cause the processor to perform operations" also can refer to causing the processor to request, trigger, cause, or otherwise direct other components or instrumentalities of the computing system to perform the operations.

For purposes of illustrating and describing the concepts of the present disclosure, the method 200 is described as being performed by the user device 102 via execution of one or more software modules such as, for example, the application manager 108. It should be understood that additional and/or alternative devices and/or network nodes can provide the functionality described herein via execution of one or more modules, applications, and/or other software including, but not limited to, the application manager 108. Thus, the illustrated embodiments are illustrative, and should not be viewed as being limiting in any way.

The method 200 begins at operation 202, wherein the user device 102 detects a resource access request. The resource access request can correspond to the user device 102 detecting loading or starting of an application, access of a file, or other types of resource access operations. Because the application manager 108 can be configured to monitor activity at the user device 102, the application manager 108 can detect the request via detecting various operations in addition to, or instead of, receiving or detecting a request, per se. As such, it should be understood that the functionality described herein with respect to operation 202 can correspond to detecting any type of resource access at the user device 102.

From operation 202, the method 200 proceeds to operation 204, wherein the user device 102 identifies one or more resources associated with the resource request detected in operation 202. In particular, the user device 102 can identify one or more local resources 110, remote resources 114, and/or other resources that can provide the functionality requested or accessed in operation 202. In some embodiments, the user device 102 can be configured to access a location, device, network, or the like for various types of operations. The types of operations that cause the user device 102 to access the remote resources 114 can be specified by settings, preferences, or the like. Thus, the user device 102 can determine, based upon the access request detected in operation 202, what resources are and/or are not available to provide the requested resource access. The available resources can include one or more local and/or remote resources, as explained above.

From operation 204, the method 200 proceeds to operation 206, wherein the user device 102 can determine if a setting specifies use of the remote resource 114. In some embodiments, a user or other entity may wish to offload certain types of operations from the user device 102 to reduce load on the memory, processor, and/or other resources of the user device 102. As such, the user or other entity may specify, via requests and/or settings, that remote resources 114 are to be accessed to provide the operations and/or functionality described herein. Thus, the user device 102 can examine, in operation 206, one or more settings to determine if the user device 102 is to access the local resource 110, the remote resource 114, and/or a combination thereof. As will be described in more detail with reference to FIGS. 3A-3E, the settings can be set by a user to apply to any resource requests, to apply to a specific resource request, and/or during various operations.

If the user device 102 determines, in operation 206, that the setting does not specify use of the remote resource 114, the method 200 proceeds to operation 208, wherein the user device 102 accesses the local resource 110. The user device 102 also can execute the operation or other resource access requested in operation 202 against the local resource 110, though not separately illustrated in FIG. 2. If the user device 102 determines, in operation 206, that the setting specifies use of the remote resource 114, the method 200 proceeds to operation 210, wherein the user device 102 accesses the remote resource 114. The user device 102 also can execute the operation or other resource access requested in operation 202 against the remote resource 114, though not separately illustrated in FIG. 2.

From operations 208 and 210, the method 200 proceeds to operation 212, wherein the user device 102 can determine if traffic suggests switching resources accessed in operations 208 and/or 210. In particular, the user device 102 can access network utilization information such as traffic congestion, utilization numbers, and/or other information to determine if a remote resource 114 is to be accessed and/or not to be accessed. If network congestion between the user device 102 and an accessed remote resource 114 exceeds a specified threshold such as 50%, 75%, or the like (up to but not exceeding 100%), the user device 102 can determine that the resources are to be switched to avoid delays and/or latency between the user device 102 and the remote resource 114. If network congestion between the user device 102 and a remote resource 114 that is not being accessed drops below a specified threshold such as 50%, 40%, or the like (down to but not less than 0%), the user device 102 can determine that the resources are to be switched to allow access to the remote resource 114 and/or to suggest that the resources be switched to a user or other entity.

If the user device 102 determines, in operation 212, that traffic suggests switching the resources, the method 200 proceeds to operation 214. In operation 214, the user device 102 can switch the accessed resources by accessing the remote resource 114, by stopping access of the remote resource 114, by accessing the local resource 110, by stopping access of the local resource 110, and/or combinations thereof. The user device 102 also can execute the operation or other resource access requested in operation 202 against the switched resources, though not separately illustrated in FIG. 2. If the user device 102 determines, in operation 212, that traffic suggests switching the resources, the method 200 proceeds to operation 216.

In operation 216, the user device 102 can determine if input has been received for switching the resources. In particular, as will be illustrated and described in detail below with reference to FIGS. 3A-3E, the user device 102 can display one or more user interfaces ("UIs") for switching accessed resources during resource access. Thus, operation 216 can correspond to determining, by the user device 102, if an option for switching resources has been received at the user device 102. If the user device 102 determines, in operation 216, that input has been received for switching the resources, the method 200 can proceed to operation 214 as described above.

From operation 214, and/or from operation 216 if the user device 102 determines, in operation 216, that input has not been received for switching the resources, the method 200 can proceed to operation 218. In operation 218, the user device 102 can determine if the operation requested or begun in operation 202 has been completed. As noted above, the user device 102 can monitor the applications, files, and/or other resources accessed in operation 202 to determine when the resource is released or when access is complete. If the user device 102 determines, in operation 218, that the operation is not complete, the method 200 can return to operation 212 as described above. As such, it should be understood that that operations 212-218 can be repeated until the operation is complete, though this is not necessarily the case. If the user device 102 determines, in any iteration of operation 218, that the operation is complete, the method 200 can proceed to operation 220. The method 200 ends at operation 220.

Figure 3A:
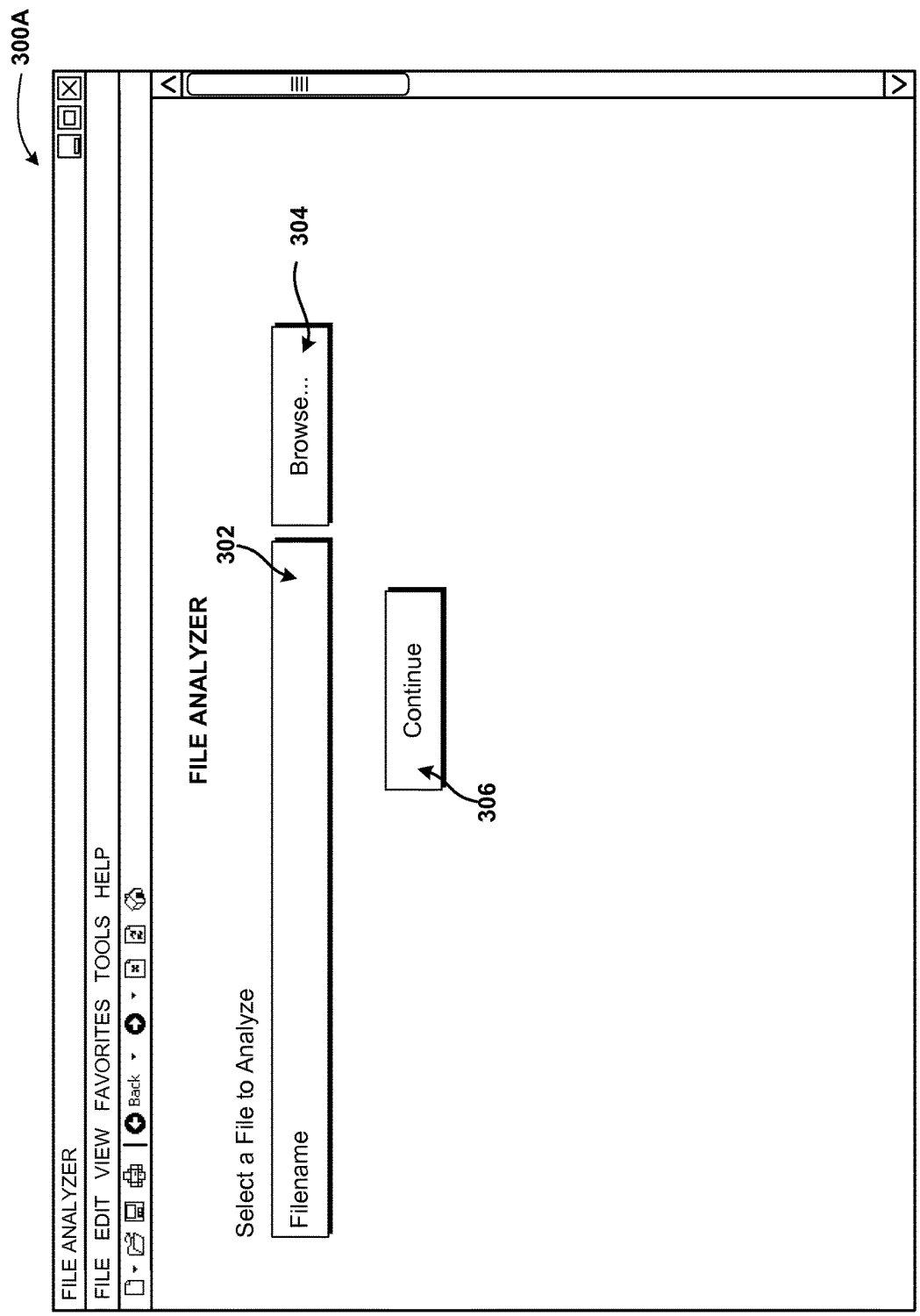
FIGS. 3A-3E are user interface diagrams illustrating some aspects of the concepts and technologies disclosed herein, according to various illustrative embodiments.

Turning now to FIG. 3A, a UI diagram showing aspects of a UI for managing resource access in some embodiments will be described. In particular, FIG. 3A shows a screen display 300A that can be presented at the user device 102 to provide the functionality described herein for managing resource access in distributed computing environments. In some embodiments, the screen display 300A is generated by an application program executing at the user device 102 and/or the application manager 108. In some other embodiments, the screen display 300A can be rendered by the user device 102, but the data corresponding to the screen display 300A can be provided by a local or remote service, a web page, or the like. It should be appreciated that the UI diagram illustrated in FIG. 3A is illustrative of one contemplated embodiment, and therefore should not be construed as being limiting in any way.

The screen display 300A shown in FIG. 3A includes various menu items and/or icons. It should be understood that the illustrated menu items and/or icons are illustrative and that additional and/or alternative menu items are possible and are contemplated. For example, various commands, command ribbons, icons, search boxes, input boxes, and/or other UI controls for viewing and/or interacting with the information shown on the screen display 300A can be presented on the screen display 300A. The screen display 300A is illustrated as displaying an application window associated with a file analyzer application. This embodiment is merely illustrative and is provided to describe various aspects of the concepts and technologies disclosed herein. Because the functionality described herein can be used to manage access to various types of data and/or resources, as explained above, it should be understood that the illustrated embodiment is illustrative, and should not be construed as being limiting in any way.

The screen display 300A is illustrated as displaying a text entry window 302. According to various embodiments, the text entry window 302 can be used to enter text for identifying a file or other resource that is to be analyzed by the file analyzer application. It should be understood that in various embodiments, the text entry window 302 can be used to specify a file, application, or other type of data that is to be accessed by the user device 102. The screen display 300A also can include a UI control 304 that, when selected, causes the user device 102 to display a dialog for locating a file and/or otherwise allowing a user or other entity to locate and/or specify a file or other resource to be accessed by the user device 102. It should be understood that selection of a file, application, or other resource via the UI control 304 can cause the user device 102 to enter the filename, application name, and/or other resource identifier or locator in the text entry window 302, though this is not necessarily the case.

The screen display 300A also includes a UI control 306. The user device 102 can be configured to recognize selection of the UI control 306. In response to detecting selection of the UI control 306, the user device 102 can provide additional options for accessing the resource specified via the text entry window 302 and/or the UI control 304. Because additional or alternative information can be provided on the screen display 300A, it should be understood that this embodiment is illustrative, and should not be construed as being limiting in any way.

Figure 3B:
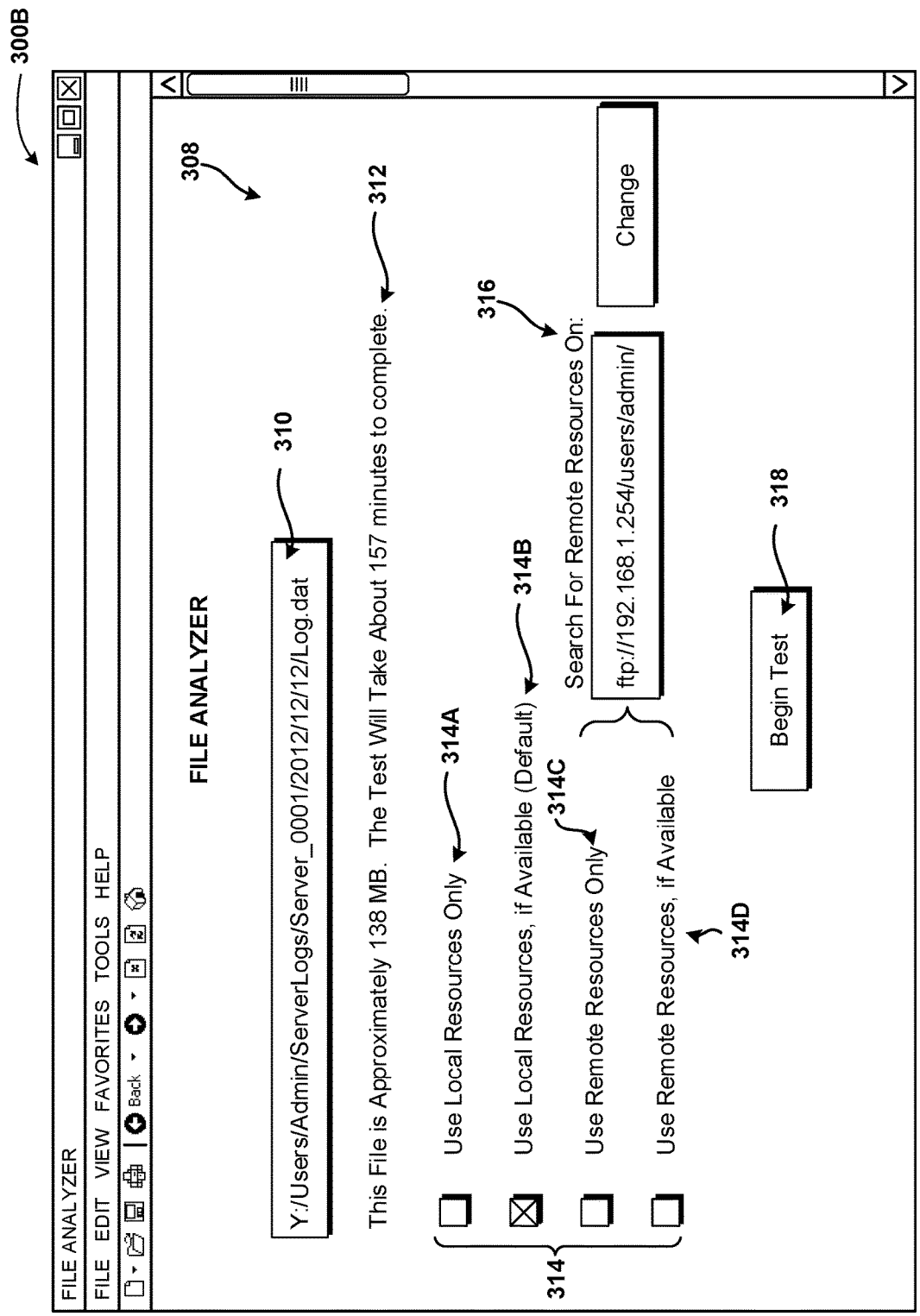

Turning now to FIG. 3B, a UI diagram showing aspects of a UI for managing resource access will be described, according to an illustrative embodiment. The UI illustrated in FIG. 3B can be, but is not necessarily, generated in response to receiving or detecting a selection of the UI control 306 illustrated in FIG. 3A. It should be appreciated that the UI diagram illustrated in FIG. 3B is illustrative of one contemplated embodiment, and therefore should not be construed as being limiting in any way.

The screen display 300B includes a resource access details window 308. The resource access details window 308 is illustrated as displaying additional details associated with the resource selected or specified by way of the screen display 300A illustrated and described above with reference to FIG. 3A. The details can include, but are not limited to, a resource locator or file name window 310, a resource usage indicator 312 associated with accessing the specified resource, and/or additional or alternative information. It should be understood that the file name window 310 can be used to display the resource being accessed by the user device 102 and may correspond, in some embodiments, to the file or location selected or specified in the text entry window 302. The resource usage indicator 312 can identify resources that may be used to access or use the specified resource and can indicate estimated resource usage such as, for example, bandwidth usage, time, disk space, processor usage, memory usage, or the like. Because other types of resources may be reflected in the resource usage indicator 312, it should be understood that these embodiments are illustrative, and should not be construed as being limiting in any way.

The screen display 300B also can display one or more options 314A-D (hereinafter collectively and/or generically referred to as "options 314"). The options 314 can be used to specify resources to be accessed by the user device 102. It should be understood that the resources to be accessed can include one or more local resources 110, one or more remote resources 114, how and/or when resources will or will not be accessed, other options, and/or the like. The resource access details window 308 also can include a remote resource menu 316 for specifying and/or changing a remote resource and/or remote resource location. Thus, a user or other entity can specify a remote resource 114 and/or a remote resource location to be accessed by the user device 102. The resource access details window 308 also can include a UI control 318 for accessing the resource(s) specified in the resource access details window 308. Because additional or alternative information can be included in the resource access details window 308, the illustrated embodiment should not be construed as being limiting in any way.

Figure 3C:
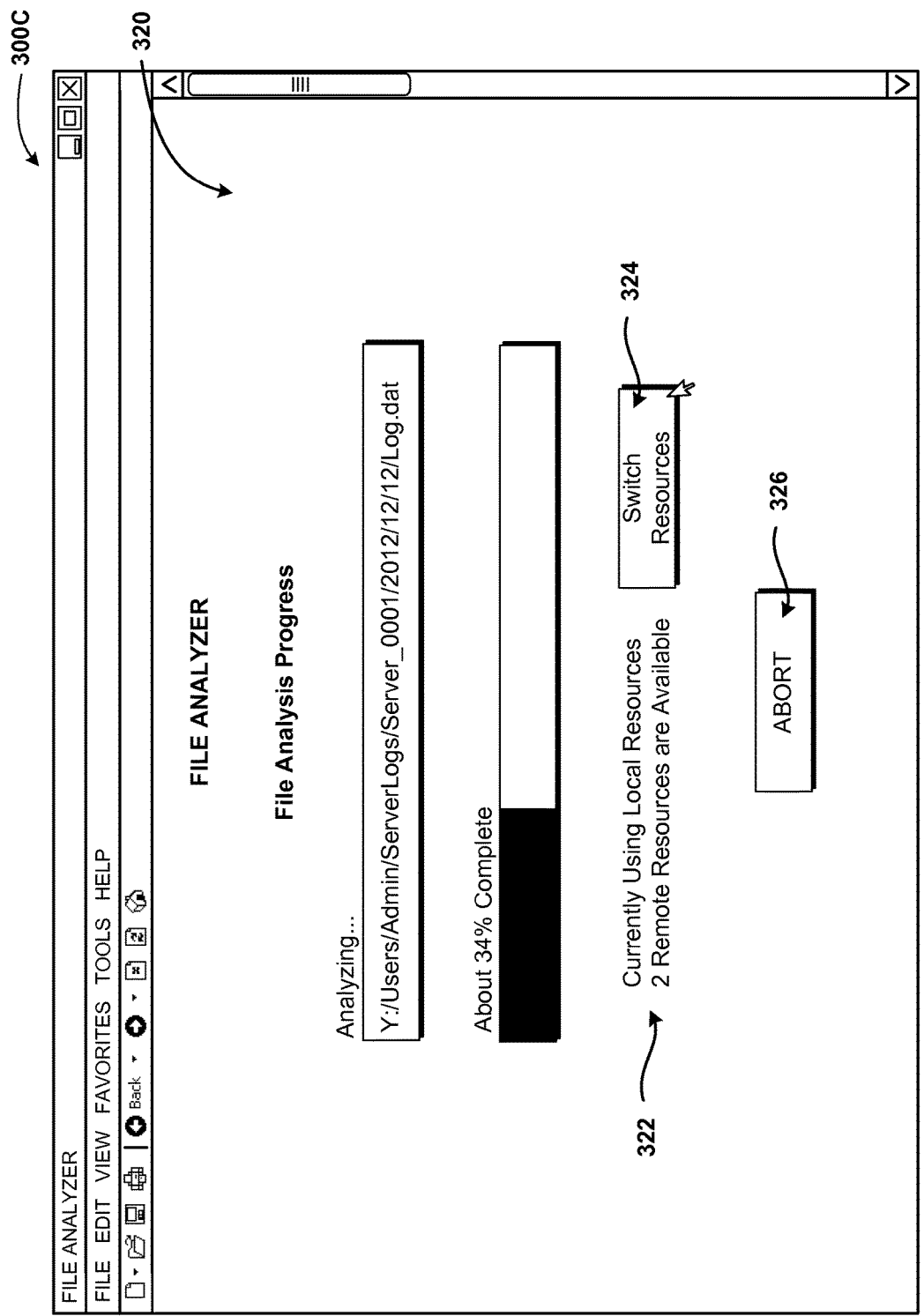

Turning now to FIG. 3C, a UI diagram showing aspects of a UI for managing resource access will be described, according to an illustrative embodiment. The UI illustrated in FIG. 3C can be, but is not necessarily, generated in response to receiving or detecting a selection of the UI control 318 illustrated in FIG. 3B. It should be appreciated that the UI diagram illustrated in FIG. 3C is illustrative of one contemplated embodiment, and therefore should not be construed as being limiting in any way.

The screen display 300C includes a resource access status display 320. The resource access status display 320 is illustrated as displaying additional information and/or status information associated with the resource access specified by way of the screen displays 300A-300B illustrated and described above with reference to FIGS. 3A-3B. The resource access status display 320 can include information specifying a resource locator or file name window and a status indicator. The resource access window 320 also can include an indication 322 of resource(s) being accessed and/or available resources. Because other information such as resource utilization, memory utilization, network congestion, network bandwidth utilization, error logs, and/or other information can be included in the indication 322, it should be understood that the embodiment shown in FIG. 3C is illustrative, and should not be construed as being limiting in any way.

The screen display 300C also can display a UI control 324 for switching, adding, and/or removing one or more resource(s) being accessed by the user device 102. As such, selection of the UI control 324 can cause the user device 102 to display options for modifying what resource(s) are being accessed by the user device 102. Additionally, the screen display 300C can display a UI control 326 for aborting or terminating access of the resource(s) by the user device 102. Because additional or alternative information can be included in the resource access status display 320, the illustrated embodiment should not be construed as being limiting in any way.

Figure 3D:
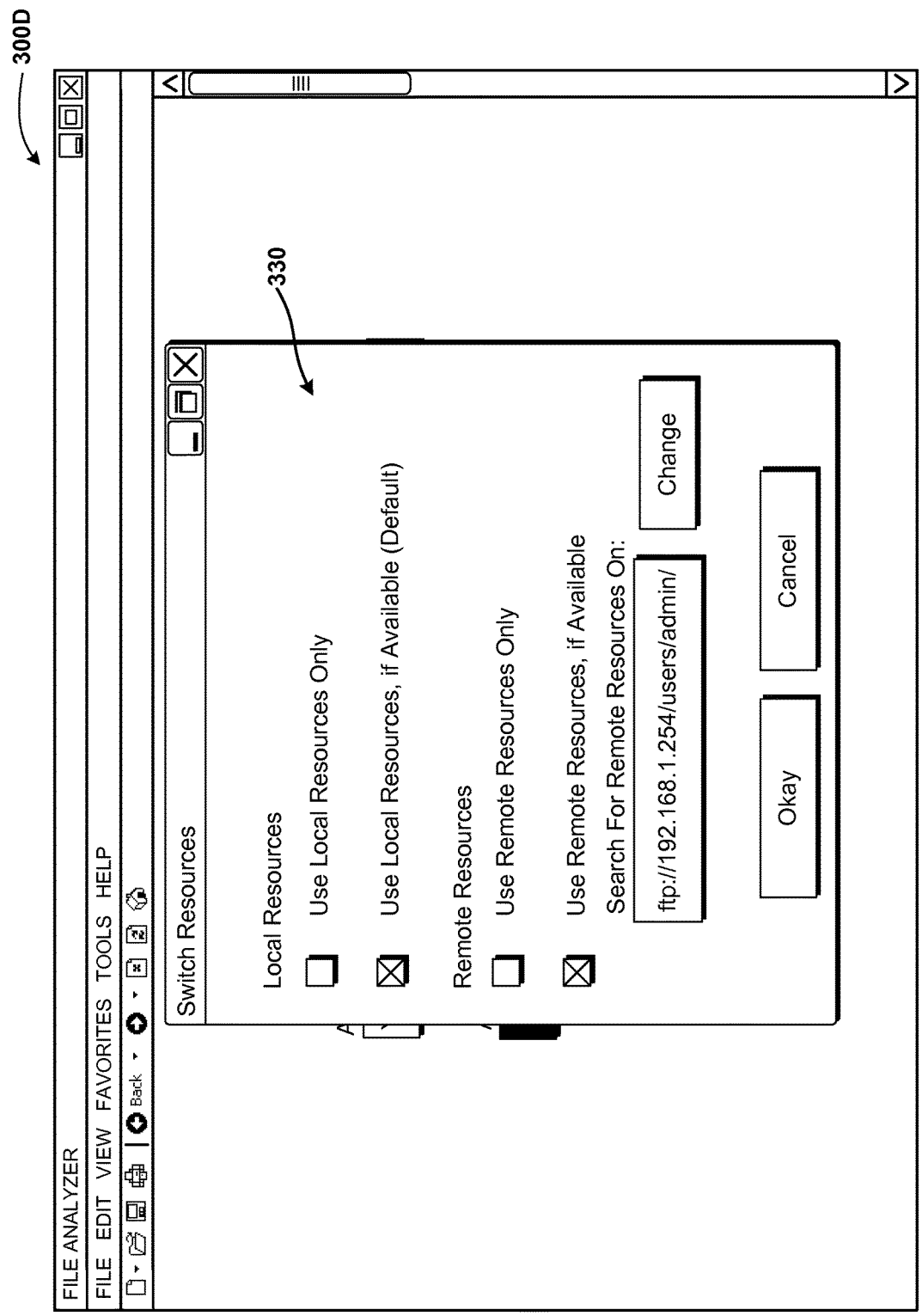

Turning now to FIG. 3D, a UI diagram showing aspects of a UI for managing resource access will be described, according to an illustrative embodiment. The UI illustrated in FIG. 3D can be, but is not necessarily, generated in response to receiving or detecting a selection of the UI control 324 illustrated in FIG. 3B. It should be appreciated that the UI diagram illustrated in FIG. 3D is illustrative of one contemplated embodiment, and therefore should not be construed as being limiting in any way.

The screen display 300D includes a resource specification window 330. The resource specification window 330 is illustrated as displaying the options 314 illustrated and described above with reference to FIG. 3B. Thus, a user or other entity can modify the resource(s) being accessed by the user device 102 during one or more operations associated with the access being managed. Thus, embodiments of the concepts and technologies disclosed herein can allow users to choose, during various operations, whether to access local and/or remote resources. Because additional or alternative information can be included in the resource specification window 330, the illustrated embodiment should not be construed as being limiting in any way.

Figure 3E:
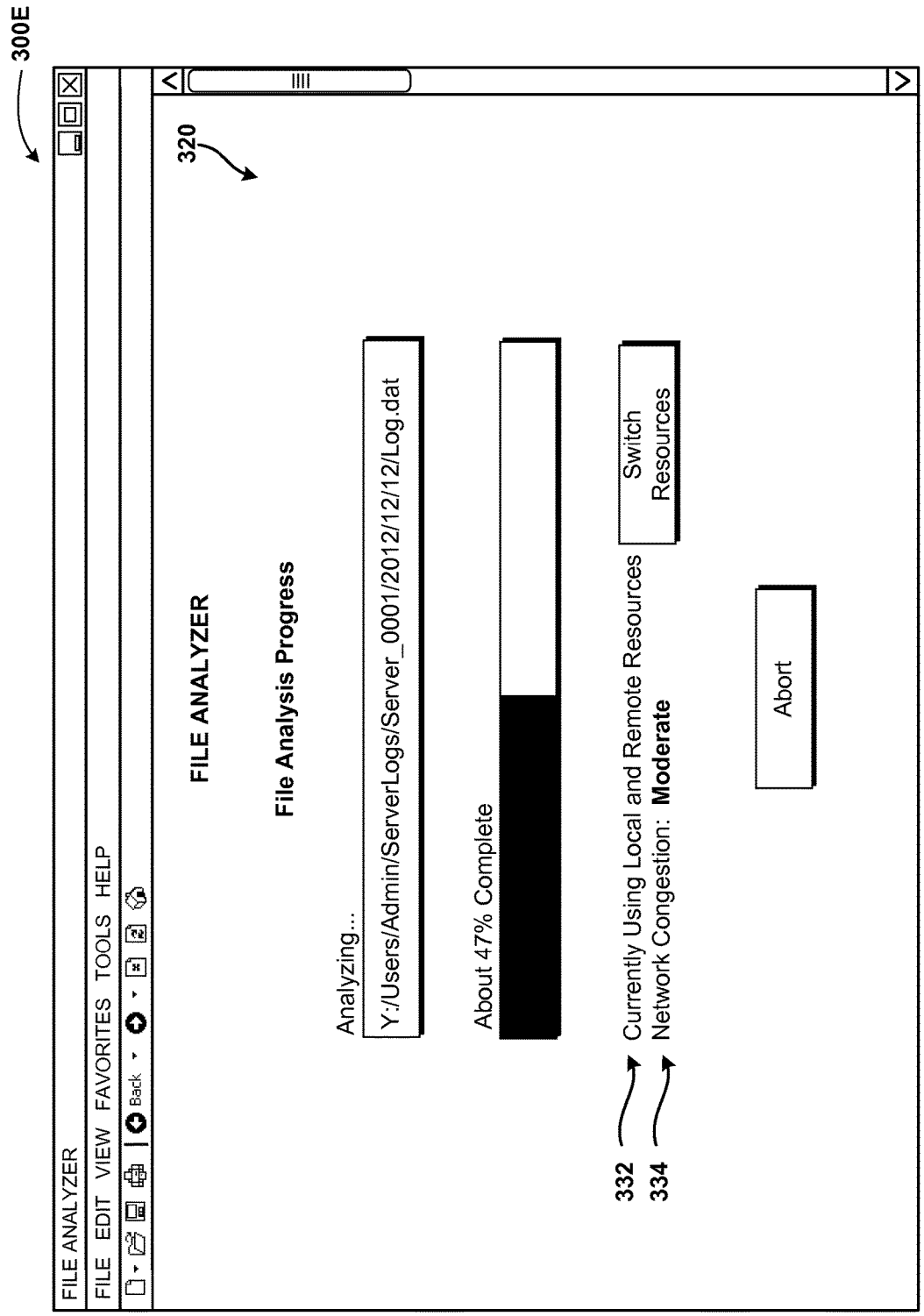

Turning now to FIG. 3E, a UI diagram showing aspects of a UI for managing resource access will be described, according to an illustrative embodiment. It should be appreciated that the UI diagram illustrated in FIG. 3E is illustrative of one contemplated embodiment, and therefore should not be construed as being limiting in any way. The screen display 300E includes a resource access status display 320, which can be, but is not necessarily, similar to the resource access status display 320 illustrated and described above with reference to FIG. 3C.

The resource access status display 320 shown in FIG. 3E also can display information and/or status information associated with the resource access. As shown in FIG. 3E, however, the resource access status display 320 can include an updated indication 332 that can reflect information associated with one or more remote resources 114. Thus, for example, the indication 332 can display information specifying one or more resources being accessed by the user device 102. The resource access window 320 also can include a network congestion indicator 334, which can identify a network congestion between the user device 102 and the remote resource(s) 114 being accessed by the user device 102. In some embodiments, if multiple remote resource(s) 114 are accessed, the user device 102 can average, select a median, or otherwise display a collective network congestion experienced between the user device 102 and the multiple remote resources 114. Because additional or alternative information can be included in the resource access status display 320, the illustrated embodiment should not be construed as being limiting in any way.

Figure 4:
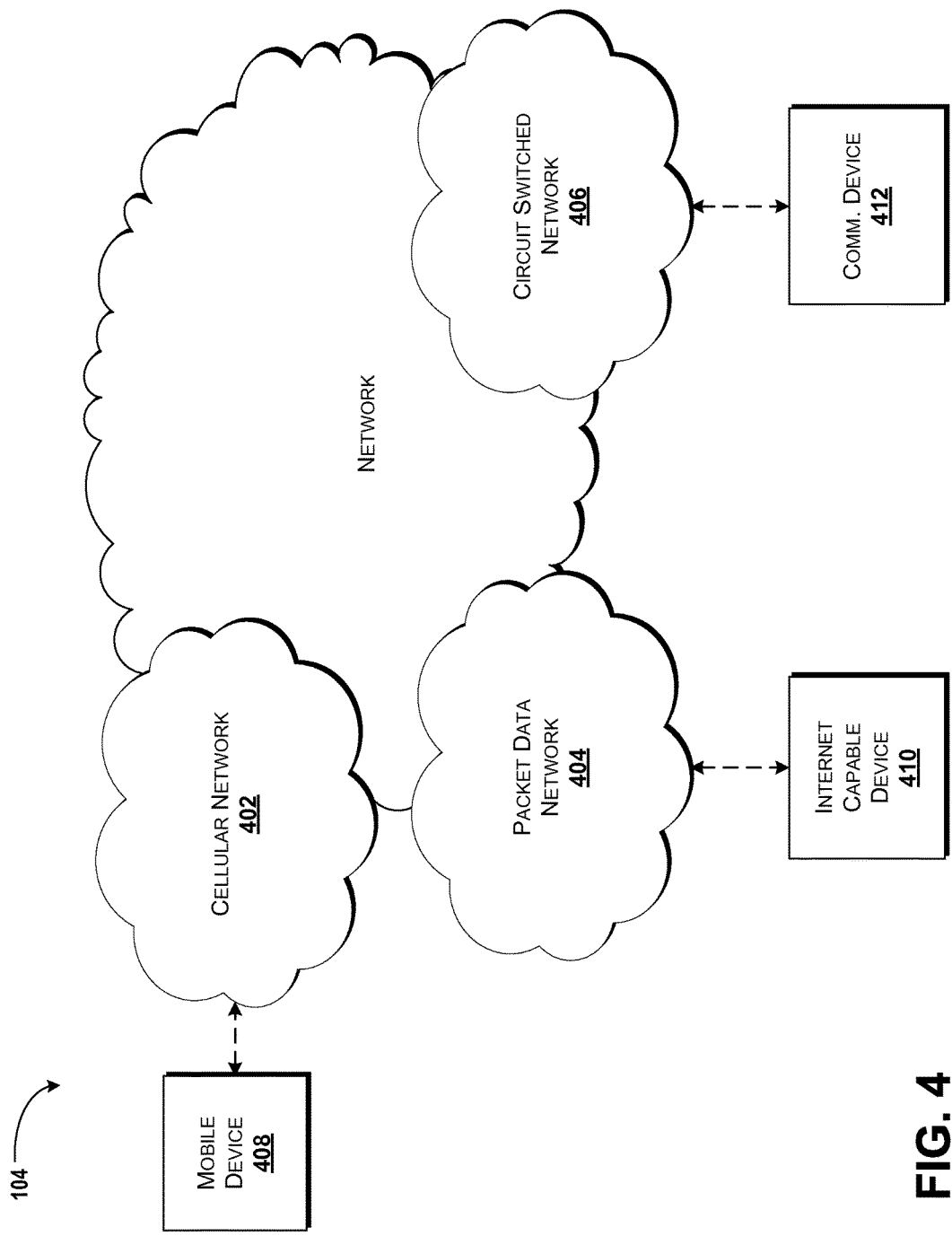
FIG. 4 schematically illustrates a network, according to an illustrative embodiment.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4 G communications standards such as WiMAX and LTE, as well as 5G and other evolved and future mobile standards.

The packet data network 404 includes various devices, for example, servers, computers, databases, and other devices in communication with another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

According to various implementations, the user device 102 described herein can be and/or can include one or more of the devices disclosed herein including, but not limited to, the mobile device 408, the Internet capable device 410, and/or the communication device 412 to access the remote resource 114, to access or receive the data 116, and/or for other functionality described herein. Additionally, it should be understood that the network 104 described herein can provide and/or can correspond to a virtual private network ("VPN") between two or more devices including, but not limited to, the user device 102 and/or the remote device 112. Furthermore, it should be understood that the network 104 can correspond to a distributed computing environment such as a cloud computing environment and/or various distributed real or virtual networks.

Figure 5:
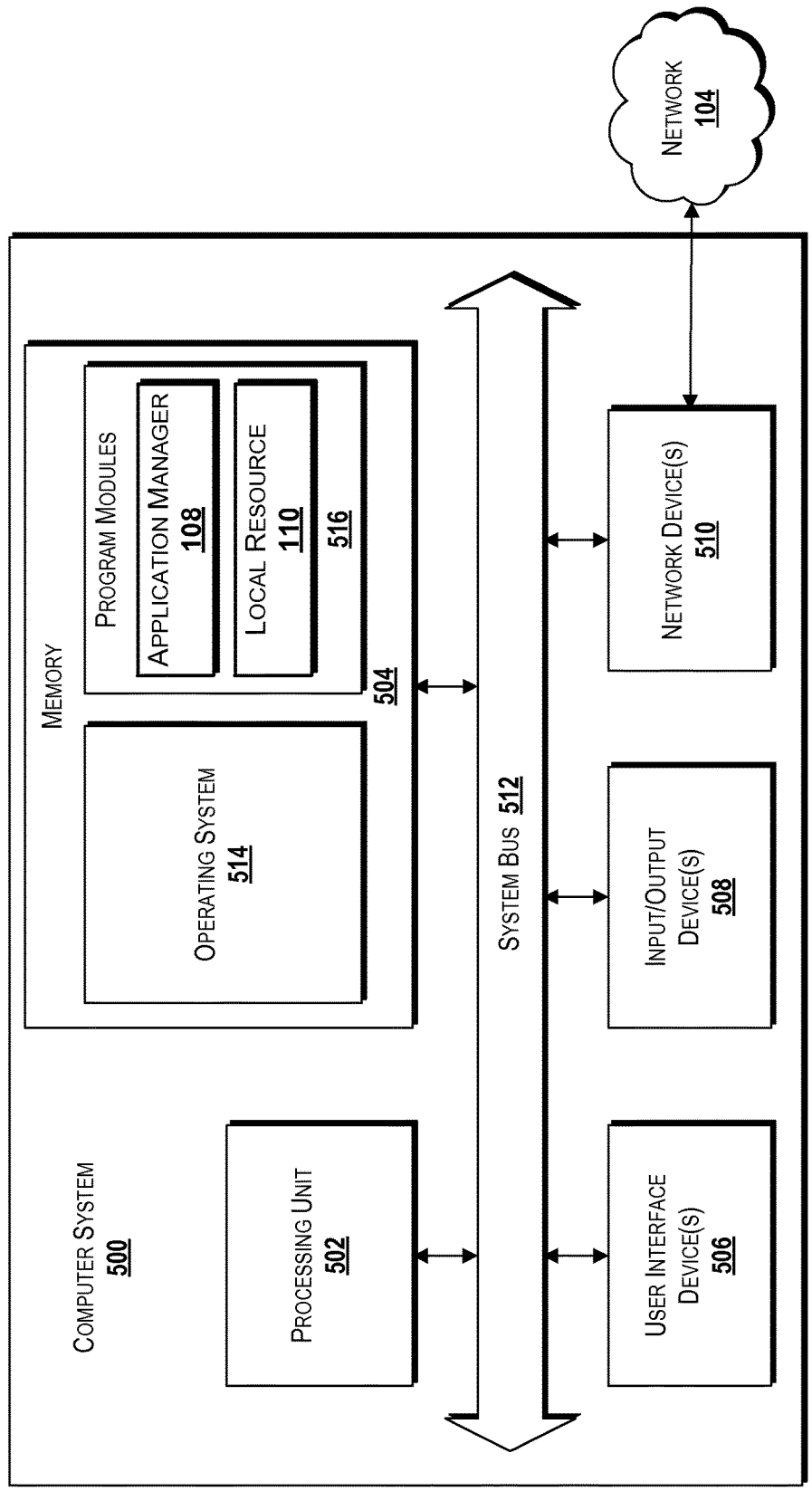
FIG. 5 is a block diagram illustrating an example computer system for managing resource access in distributed computing environments, according to some illustrative embodiments.

FIG. 5 is a block diagram illustrating a computer system 500 configured to provide the functionality described herein for a verification service, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or other families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the application manager 108. Additionally, in some embodiments the program modules 516 can include the local resource 110. These and/or other programs can be embodied in computer-readable media containing instructions that, when executed by the processing unit 502, perform the method 200 described in detail above with respect to FIG. 2. According to some embodiments, the program modules 516 may be embodied in hardware, software, firmware, or any combination thereof. Because the local resource 110 may be a file or other type of data, and not a program module, it should be understood that that the memory 504 can be configured to store the local resource 110 outside of the program modules 516 illustrated in FIG. 5.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof, does not include waves, signals, and/or other transitory and/or intangible communication media, per se.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for managing resource access in distributed computing environments have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. A computing device comprising:
a processor; and
a memory that stores computer-executable instructions that, when executed by the processor, cause the processor to perform operations comprising
detecting initialization of a native application that is executed locally by the processor, and
in response to detecting initialization of a native application,
identifying resources that can provide functionality associated with the native application, the resources comprising a remote resource comprising a copy of the native application, which is executed by a remote device, and a local resource comprising the native application that is executed locally by the processor,
determining that a setting specifies use of the remote resource to provide the functionality associated with the native application, and
accessing the remote resource to provide the functionality associated with the native application.

2. The computing device of claim 1, wherein the computer-executable instructions, when executed by the processor, cause the processor to perform operations further comprising:
obtaining network traffic information between the remote device and the computing device;
determining that the computing device is to stop accessing the remote resource and to access the local resource.

3. The computing device of claim 1, wherein the computer-executable instructions, when executed by the processor, cause the processor to perform operations further comprising:
obtaining network traffic information associated with a virtual private network via which the remote device communicates with the computing device; and
determining, based upon the network traffic information to stop accessing the remote resource and to access the local resource.

4. The computing device of claim 1, wherein the computer-executable instructions, when executed by the processor, cause the processor to perform operations further comprising:
generating a user interface comprising an option to access the remote resource, a further option to access the local resource, and a text entry field to receive text that specifies a location of the remote resource.

5. The computing device of claim 1, wherein the computer-executable instructions, when executed by the processor, cause the processor to perform operations further comprising:
generating a user interface comprising a status of a resource access operation and an option to switch the resources accessed by the computing device.

6. A computer storage medium having computer-executable instructions stored thereon that, when executed by a processor, cause the processor to perform operations comprising:
detecting a resource access request at a computing device, the resource access request comprising initialization of a native application that is executed by the computing device; and
in response to detecting initialization of a native application,
identifying resources that can provide functionality associated with the native application, the resources comprising a remote resource comprising a copy of the native application, which is executed by a remote device that is remote from the computing device, and a local resource comprising the native application that is executed by the computing device, wherein the local resource provides the same functionality as the remote resource,
determining that a setting at the computing device specifies use of the remote resource to provide the functionality associated with the native application when the native application is accessed at the computing device, and
accessing the remote resource to provide the functionality associated with the native application.

7. The computer storage medium of claim 6, wherein the computer-executable instructions, when executed by the processor, cause the processor to perform operations further comprising:
obtaining network traffic information associated with a virtual private network between the processor and the remote device hosting the remote resource, and
determining, based upon the network traffic information, to stop accessing the remote resource and to access the local resource.

8. The computer storage medium of claim 6, wherein the computer-executable instructions, when executed by the processor, cause the processor to perform operations further comprising:
generating a user interface that comprises
an option to access the remote resource,
a further option to access the local resource, and
a text entry field for text that specifies a location of the remote resource; and generating a further user interface comprising a status of a resource access operation and the option to switch resources accessed.

9. The computer storage medium of claim 8, wherein the computer-executable instructions, when executed by the processor, cause the processor to perform operations further comprising:
determining if the resource access operation is complete; and
in response to determining that the resource access operation is not complete, determining if resources accessed during the resource access operation are to be switched.

10. The computing device of claim 1, wherein the setting specifies use of the remote resource, wherein use of the remote resource offloads operations from the computing device.

11. The computing device of claim 1, wherein the setting specifies use of the remote resource, wherein use of the remote resource offloads operations from the computing device to reduce load on the memory and the processor.

12. A method comprising:
detecting, at a computing device comprising a processor that executes an application manager, a resource access request comprising initialization of a native application that is executed by the computing device; and
in response to detecting initialization of a native application,
identifying, by the processor, resources that can provide functionality associated with the native application, the resources comprising a remote resource comprising a copy of the native application, which is executed by a remote device that is remote from the computing device, and a local resource comprising the native application that is executed by the computing device, wherein the local resource provides the same functionality as the remote resource,
determining, by the processor, that a setting at the computing device specifies use of the remote resource to provide the functionality associated with the native application when the native application is accessed at the computing device, and
accessing the remote resource to provide the functionality associated with the native application.

13. The method of claim 12, wherein the computing device communicates with the remote device via a virtual private network that is established over a communications network.

14. The method of claim 13, further comprising:
obtaining network traffic information associated with the virtual private network; and
determining, based upon the network traffic information, to stop accessing the remote resource and to access the local resource.

15. The method of claim 12, further comprising:
presenting a user interface that comprises
an option to access the remote resource,
a further option to access the local resource, and
a text entry field for text that specifies a location of the remote resource.

16. The method of claim 15, further comprising:
generating a further user interface comprising a status of a resource access operation and another option to switch resources accessed.

17. The method of claim 12, wherein the setting specifies use of the remote resource, wherein use of the remote resource offloads operations from the computing device to reduce load on the processor and a memory of the computing device.

* * * * *